(12) United States Patent
Samat et al.

(10) Patent No.: US 9,934,377 B2
(45) Date of Patent: Apr. 3, 2018

(54) INPUT/OUTPUT PARAMETER SELECTION (71) Applicant: Atmel Corporation, San Jose, CA (US)

(72) Inventors: Pierre Samat, La Ciotat (FR); Alain Vergnes, Trets (FR); Michel Douguet, Marseilles (FR)

(73) Assignee: Atmel Corporation, San Jose, CA (US)

( * ) Notice: Subject to any disclaimer, the term of this patent is extended or adjusted under 35 U.S.C. 154(b) by 187 days.

(21) Appl. No.: 14/946,901

(22) Filed: Nov. 20, 2015

(65) Prior Publication Data

US 2017/0147464 A1 May 25, 2017

(51) Int. Cl.
G06F 21/55 (2013.01)
G06F 11/30 (2006.01)
G06F 13/40 (2006.01)
G06F 21/85 (2013.01)
G06F 21/60 (2013.01)

(52) U.S. Cl.
CPC ........ G06F 21/554 (2013.01); G06F 11/3051 (2013.01); G06F 11/3089 (2013.01); G06F 13/4022 (2013.01); G06F 21/55 (2013.01); G06F 21/606 (2013.01); G06F 21/85 (2013.01); H04Q 2213/05 (2013.01)

(58) Field of Classification Search
CPC ...... G06F 21/55; G06F 21/554; G06F 21/606; G06F 21/70; G06F 21/82; G06F 21/85; G06F 21/86; G06F 21/88; G06F 11/3051; G06F 11/3089
See application file for complete search history.

(56) References Cited

U.S. PATENT DOCUMENTS

| | | | | |
|---|---|---|---|---|
| 5,138,305 A * | 8/1992 | Tomiyasu | ............. | G06F 3/1475 345/213 |
| 6,490,720 B1 * | 12/2002 | Carlsen | ................... | G06F 9/465 717/127 |
| 7,644,290 B2 * | 1/2010 | Ransom | ............... | G01R 22/066 340/541 |
| 7,954,153 B2 * | 5/2011 | Bancel | .................... | G06F 11/28 713/172 |
| 8,756,594 B2 * | 6/2014 | Umansky | ............. | G06F 21/554 717/173 |
| 2009/0106563 A1 * | 4/2009 | Cherpantier | ............ | G06F 21/86 713/194 |
| 2013/0103927 A1 * | 4/2013 | Berry, Jr. | ................ | G06F 15/00 712/30 |
| 2015/0134976 A1 * | 5/2015 | Henry | ................... | G06F 21/572 713/194 |

* cited by examiner

Primary Examiner — Glenn A Auve
(74) Attorney, Agent, or Firm — Fish & Richardson P.C.

(57) ABSTRACT

A device comprises a detector configured to detect an event, and a selector coupled to the detector and configured to generate a signal in response to a detection of an event by the detector. The signal is operable to select a set of input/output (I/O) parameters from among first and second stored sets of parameters. The device also includes a configuration module coupled to the selector. The configuration module is configured to output the selected set of I/O parameters.

18 Claims, 5 Drawing Sheets

INPUT/OUTPUT PARAMETER SELECTION

TECHNICAL FIELD

The following disclosure relates generally to input/output parameter selection.

BACKGROUND

In accordance with an example scenario, a microcontroller interacts with the external environment using input/output (I/O) lines. These I/O lines of the microcontroller can be configured using a programmable input/output (PIO) controller.

SUMMARY

In one embodiment, a device comprises a detector configured to detect an event, and a selector coupled to the detector and configured to generate a signal in response to a detection of an event by the detector. The signal is operable to select a set of input/output (I/O) parameters from among first and second stored sets of parameters. The device also includes a configuration module coupled to the selector. The configuration module is configured to output the selected set of I/O parameters.

Particular embodiments may include one or more of the following features. The configuration module may include a multiplexer that is coupled to the selector. The multiplexer may be provided with the first and second stored sets of parameters as inputs. The multiplexer may be configured to receive the signal from the selector, and output one of the first and second stored sets of parameters based on receiving the signal from the selector.

The configuration module may include an I/O line management unit that is coupled to the multiplexer and an I/O line. The I/O line management unit may be configured to receive, from the multiplexer, one of the first and second stored sets of parameters, and adapt the I/O line to a selected configuration corresponding to the set of parameters received from the multiplexer.

The configuration module may include a first register for storing the first set of parameters and a second register for storing the second set of parameters. Outputs of the first register and the second register may be coupled to inputs of the multiplexer.

The first set of parameters may include first configuration parameters associated with a first mode of operation for a first I/O line and the second set of parameters may include safety configuration parameters associated with a safety mode of operation for the first I/O line. The first configuration parameters may be reconfigurable by a user, and the safety configuration parameters may not be reconfigurable by a user.

The selector may be configured to receive an indication of the event detection from the detector. In response to receiving the indication of the event detection, the selector may be configured to send the signal to the configuration module to apply the safety configuration parameters to the first I/O line.

The device may include a second I/O line configured to operate in the first mode of operation in response to receiving the indication of the event detection at the selector. The safety mode of operation may prevent the first I/O line from communicating with an external device.

The safety mode of operation may include a first safety mode of operation and a second safety mode of operation. The configuration module may be configured to switch the first I/O line from the first mode of operation to the first safety mode of operation in response to occurrence of an event of a first type. The configuration module also may be configured to switch the first I/O line from the first mode of operation to the second safety mode of operation in response to occurrence of an event of a second type.

The configuration module may include first configuration parameters associated with the first I/O line, first safety configuration parameters and second safety configuration parameters associated with the first I/O line. The configuration module further may include a multiplexer. The multiplexer may be configured to receive as inputs the first configuration parameters, the first safety configuration parameters and the second safety configuration parameters. The multiplexer may be configured to output one of the first configuration parameters, the first safety configuration parameters and the second safety configuration parameters to manage the first I/O line based on the signal from the selector.

The selector may be configured to send a first signal to the multiplexer to output the first safety configuration parameters in response to a determination that a first detected event is of a first type. The selector may be configured to send a second signal to the multiplexer to output the second safety configuration parameters in response to a determination that a second detected event is of a second type.

The event may be associated with one or more of an abnormal physical condition of the device, an unauthorized external probe applied to the device, and an unauthorized execution command applied to the device.

In another embodiment, an event is detected by a detector. In response to the detection of the event, a selector coupled to the detector generates a signal that is operable to select a set of input/output (I/O) parameters from among first and second stored sets of parameters. A configuration module coupled to the selector outputs the selected set of I/O parameters.

Particular embodiments may include one or more of the following features. Outputting the selected set of I/O parameters by the configuration module may comprise receiving, at a multiplexer included in the configuration module, the signal from the selector. The multiplexer may output one of the first and second stored sets of parameters based on receiving the signal from the selector.

An I/O line management unit, which may be included in the configuration module and coupled to the multiplexer and an I/O line, may receive one of the first and second stored sets of parameters from the multiplexer. The I/O line management unit may adapt the I/O line to a selected configuration corresponding to the set of parameters received from the multiplexer.

The first set of parameters may include first configuration parameters associated with a first mode of operation for a first I/O line and the second set of parameters may include safety configuration parameters associated with a safety mode of operation for the first I/O line. The first configuration parameters may be reconfigurable by a user. The safety configuration parameters may not be reconfigurable by a user.

The selector may receive an indication of the event detection from the detector. In response to receiving the indication of the event detection, the selector may send the signal to the configuration module to apply the safety configuration parameters to the first I/O line.

The safety mode of operation may prevent the first I/O line from communicating with an external device. The safety mode of operation may include a first safety mode of operation and a second safety mode of operation. The configuration module may switch the first I/O line from the first mode of operation to the first safety mode of operation in response to occurrence of an event of a first type. The configuration module may switch the first I/O line from the first mode of operation to the second safety mode of operation in response to occurrence of an event of a second type.

The configuration module may include first configuration parameters associated with the first I/O line, first safety configuration parameters and second safety configuration parameters associated with the first I/O line and a multiplexer. The multiplexer may receive as inputs the first configuration parameters, the first safety configuration parameters and the second safety configuration parameters. The multiplexer may output one of the first configuration parameters, the first safety configuration parameters and the second safety configuration parameters to manage the first I/O line based on the signal from the selector.

Outputting, by the multiplexer, one of the first configuration parameters, the first safety configuration parameters and the second safety configuration parameters may comprise sending, by the selector, a first signal to the multiplexer to output the first safety configuration parameters in response to a determination that a first detected event is of a first type. The selector may send a second signal to the multiplexer to output the second safety configuration parameters in response to a determination that a second detected event is of a second type.

The event may be associated with one or more of an abnormal physical condition of a device, an unauthorized external probe applied to the device, and an unauthorized execution command applied to the device.

Embodiments disclosed herein include methods, systems, computer program products and computer-readable media. One such system includes one or more processors and a storage device storing instructions that, when executed by the one or more processors, cause the one or more processors to perform the above-described actions. One such computer program product is embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above described actions.

DETAILED DESCRIPTION

The present disclosure describes systems and techniques for applying a safety configuration to an I/O line of a microcontroller upon detection of an abnormal condition associated with the microcontroller. Under normal operating conditions, a PIO controller included in the microcontroller manages the I/O line to operate using a first operation mode. A hardware module associated with the PIO controller communicates with an event detector. In response to detection of an abnormal condition, such as a tamper event or other event (for example, frequency, voltage, or temperature monitoring event), the hardware module is triggered to apply a second mode of operation to the I/O line. In an embodiment, the second mode of operation is a safety mode of operation.

In an embodiment, a safety configuration is applied to a microcontroller I/O line automatically and immediately by hardware, without software intervention, upon detection of an abnormal condition, such as a tamper event or other unauthorized event. When the safety configuration is applied, the I/O line is prevented from receiving instructions and/or data from an external source, or sending instructions and/or data to an external source. In this manner, the systems and techniques can prevent malicious software (e.g. malware) from modifying a software configuration of the I/O line, or prevent malicious software in the microcontroller from modifying operations of other devices, and thereby make the microcontroller more secure against attacks. Additionally or alternatively, for hardware or software certification, an embodiment disclosed herein allow to certify that access (for example, data in or out) to the hardware will not be performed under abnormal event detection. This may be useful to expedite official security laboratory certification. Use of the hardware approach disclosed herein can also make a response to an abnormal condition faster compared to a software approach. Further, the hardware module may be easier to implement compared to a software solution, since the latter may involve a certification process for its security abilities.

In an embodiment, a microcontroller includes one or more I/O lines to interact with the external environment. For example, the microcontroller interfaces with a first external device using a first I/O line, and with a second external device using a second I/O line. The microcontroller sends instructions and/or data to, or receives instructions and/or data from, the first external device over the first I/O line, and the second external device over the second I/O line. The microcontroller may use other I/O lines to communicate with other external devices in a similar manner. The first or second external device can be another microcontroller, a storage device, a user input device, a remote network device, among others.

In an embodiment, a microcontroller includes a PIO controller, which is configured to manage the I/O lines of the microcontroller to interact with the external environment. For example, the PIO controller is configured to apply an application configuration to a first I/O line of the microcontroller. The application configuration may be determined based on the instructions and/or data to be processed by the first I/O line. The first I/O line performs in a first mode of operation when the application configuration is applied. In an embodiment, the first mode of operation corresponds to a normal or regular mode of operation, e.g., a mode that is executed in the absence of a tamper event or other abnormal conditions. The PIO controller configures other I/O lines of the microcontroller in a similar manner. The configuration of each I/O line may be programmed by software according to the chosen application associated with the respective I/O lines.

In an embodiment, for safety or security reasons, the PIO controller is designed to apply a safety configuration to one or more I/O lines of the microcontroller when an abnormal condition is detected. For example, the abnormal condition can be a temperature overrun or opening of the physical microcontroller case, or opening the package of the appliance embedding the microcontroller. The PIO controller can be designed in this manner to help obtain certification like "IEC 60335 Class B certification." As another example, a microcontroller used in a secure banking system can include a PIO controller that is designed to automatically set some microcontroller I/O lines in security mode to avoid sending secure data to an external malicious probing system in case of an external tamper event.

In this context, an abnormal condition refers to any condition of the microcontroller, or occurrence of an event, that deviates from normal operating conditions of the microcontroller. For example, an abnormal condition can be a tamper event, which refers to an action on the microcontroller that attempts to interfere with or make unauthorized alternations to the operation of components of the microcontroller. A tamper event can be a physical intrusion on the microcontroller, for example, a physical probe on the microcontroller body, an attempt to open the microcontroller casing, or an unauthorized user input on a microcontroller I/O line that is different from expected or known user inputs. Alternatively, a tamper event can be a software intrusion on the microcontroller, for example, a malicious software that attempts to modify the microcontroller firmware. A tamper event can be an external event, such as an external physical probe on the microcontroller body, or an unauthorized user input. Alternatively, a tamper event can be generated internally, such as when a malicious software that has modified some configuration of the microcontroller attempts to send unauthorized instructions or data through one or more I/O lines. As indicated previously, abnormal conditions can also include a sudden rise in the internal temperature of the microcontroller (e.g., a change in temperature beyond a preset threshold that occurs in the order of a few hundreds of milliseconds to a few seconds), or a voltage or current spike, among others. In the following sections, the terms abnormal condition and tamper event are used to refer to any event or action that attempts to alter, or interfere with, operation of a microcontroller.

In an embodiment, safety configuration parameters are applied to I/O lines of a microcontroller using hardware circuitry. Indeed, in one embodiment, this is achieved using an additional hardware module in the microcontroller that is coupled to an event detector in the microcontroller. In this context, "coupled to" does not necessarily mean directly coupled to; one or more intermediary components may be present between two hardware modules that are coupled to one another.

When the event detector detects a tamper event or other abnormal condition, the hardware module is triggered to apply safety configuration parameters to the microcontroller I/O lines automatically and immediately. The process may be faster compared to reconfiguring the PIO controller to load, by software, the safety configuration parameters as discussed above. Since software configuration is not involved, this may avoid the software certification complexities, or be less susceptible to modification by malicious software. The additional hardware module is implemented as part of the PIO controller. The following sections describe a microcontroller that includes such hardware circuitry for applying safety configuration parameters to microcontroller I/O lines, and techniques by which the hardware circuitry are used to apply the safety configuration parameters to the I/O lines.

Figure 1:
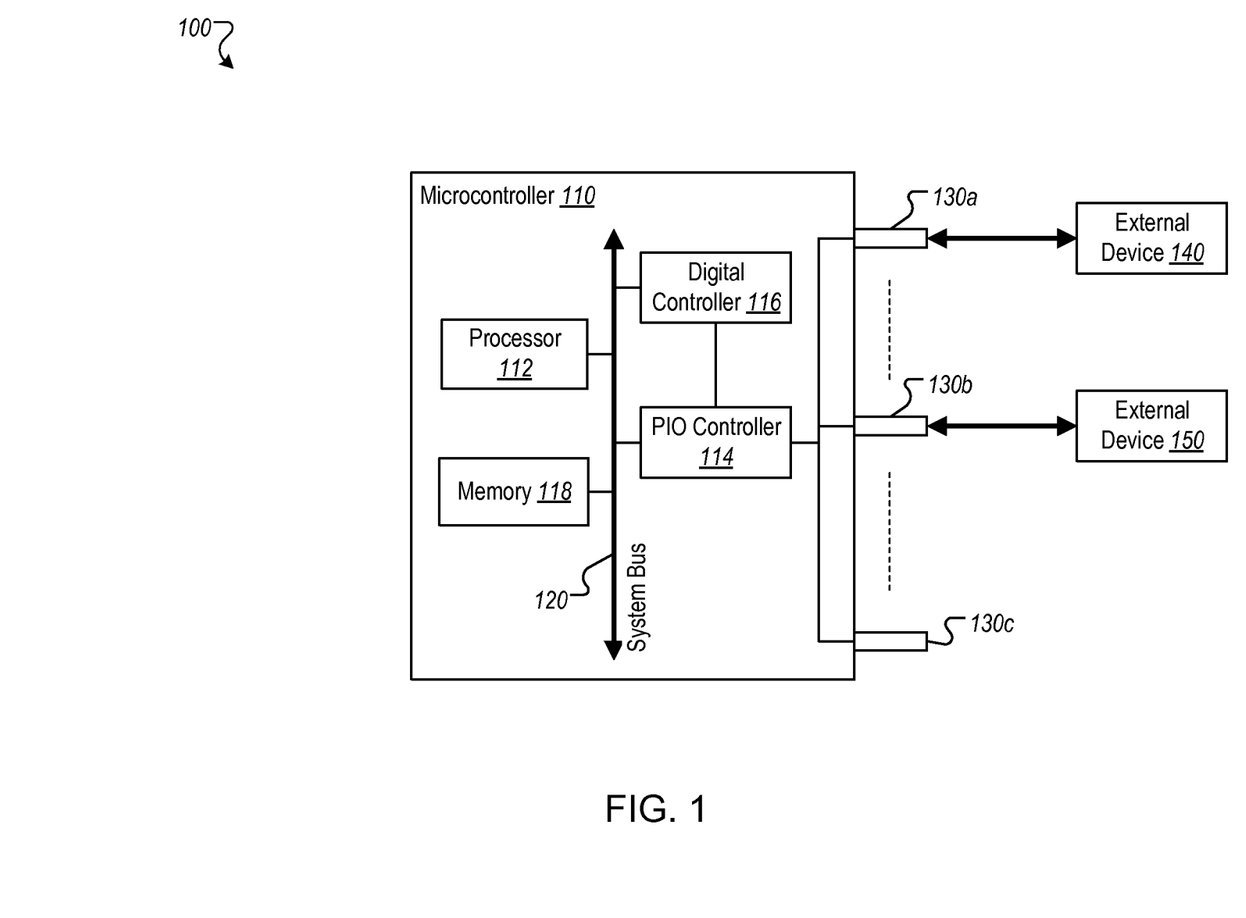
FIG. 1 is a block diagram of an example system that includes a microcontroller, according to an embodiment.

FIG. 1 is a block diagram of an example system 100 that includes a microcontroller 110, according to an embodiment. In addition to the microcontroller 110, the system 100 includes external devices 140 and 150. The microcontroller 110 includes a processor 112, a PIO controller 114, a digital controller 116, memory 118 and a system bus 120. The microcontroller 110 also includes one or more I/O lines 130 (130a, 130b and 130c) for interfacing with other devices and the external environment. The I/O lines 130 may be referred to as pads or pins of the microcontroller.

As shown, the microcontroller 110 communicates with the external devices 140 and 150 through I/O lines 130a and 130b. The first or second external device can be another microcontroller, a storage device, a user input device, a remote network device, among others. The microcontroller 110 may communicate with the external devices 140 and/or 150 over direct physical links, for example, when the microcontroller 110 and the external device 140 and/or external device 150 are in the same local area network. Additionally or alternatively, the microcontroller 110 may communicate with the external devices 140 and/or 150 over wide area networks, for example, when the external device 140 and/or external device 150 are remote network devices. In some cases, the microcontroller 110 may be physically coupled to the external device 140 or 150, for example, when the microcontroller 110 is embedded in the device 140 or 150, respectively. For example, the device 140 may be a display device and the microcontroller 110 may be embedded in the display device. As another example, the device 150 may be a point of sales terminal in which the microcontroller 110 is embedded.

The microcontroller 110 is an integrated circuit with computing functionality. The microcontroller uses the processor 112 to perform various computing operations. The microcontroller 110 can be used in embedded applications, among other uses. For example, the microcontroller can be used to drive a liquid crystal display (LCD) of a point of sales terminal.

The PIO controller 114 includes hardware circuitry configured to manage the operations of the I/O lines 130. The PIO controller 114 applies application configuration parameters to each I/O line that are determined based on the type of application processed by the particular I/O line, for example, the type of instructions and/or data that are exchanged with an external device using the I/O line. During operation, each I/O line operates based on the application configuration parameters applied to the I/O line. For example, considering the point of sales terminal example above, some I/O lines of the microcontroller may be configured to handle user inputs received (for example, through a keypad) at the point of sales terminal, while some other microcontroller I/O lines may be configured to provide the data on the display. The application configuration parameters may be programmed by a user, for example a system administrator.

In one embodiment, different application configuration parameters are applied to different I/O lines 130. This is the case, for example, when the different I/O lines handle different types of instructions and/or data, as noted in the point of sales terminal example above. However, in another embodiment, two or more I/O lines 130 share the same application configuration parameters, for example, when such I/O lines handle the same type of instructions and/or data. In one embodiment, the same application configuration parameters may be applied to all the I/O lines. This is the case, for example, when all I/O lines handle the same type of instructions and/or data.

The digital controller 116 is circuitry included in the microcontroller 110 that is configured to process the instructions and/or data exchanged with the external environment.

The instructions and/or data are conveyed to and from the digital controller 116 by the I/O lines interfacing with the external environment. In one embodiment, the I/O lines are configured to act as conduit for the instructions and/or data exchanged with the external environment, while processing of the instructions and/or data are performed by the digital controller 116. Considering the point of sales terminal example described above, the digital controller 116 may be an LCD controller, which sends data to the microcontroller I/O lines that drive the terminal display. Although one digital controller is shown, the microcontroller 110 may include more than one digital controller, such as a network controller to process network data on some I/O lines, other display controllers, or an input interface controller, among others. In an embodiment, the digital controller 116 can be coupled to system bus 120.

The microcontroller 110 includes additional hardware modules or components, such as memory 118. The memory 118 may represent program memory, which may be in the form hardware registers, flash memory, random access memory, or ready-only memory. In one embodiment, application configuration parameters for I/O lines 130 are stored in the memory 118, and are loaded into the PIO controller 114 when the microcontroller 110 is powered up.

The microcontroller 110 can include other modules. For example, the microcontroller 110 may include an event detector that is configured to monitor the operating conditions of the microcontroller and detect occurrence of abnormal conditions, such as a tamper event or other unauthorized events, as described in reference to FIG. 2A.

The system bus 120 in the microcontroller 110 transfers data among the various microcontroller components, such as processor 112, the memory 118, the PIO controller 114 and the digital controller 116. In one embodiment, additional communication channels exist between the PIO controller 114 and the digital controller 116. In one embodiment, application configuration(s) for I/O lines 130 are sent from the memory 118 to the PIO controller 114 through the system bus 120.

Figure 2A:
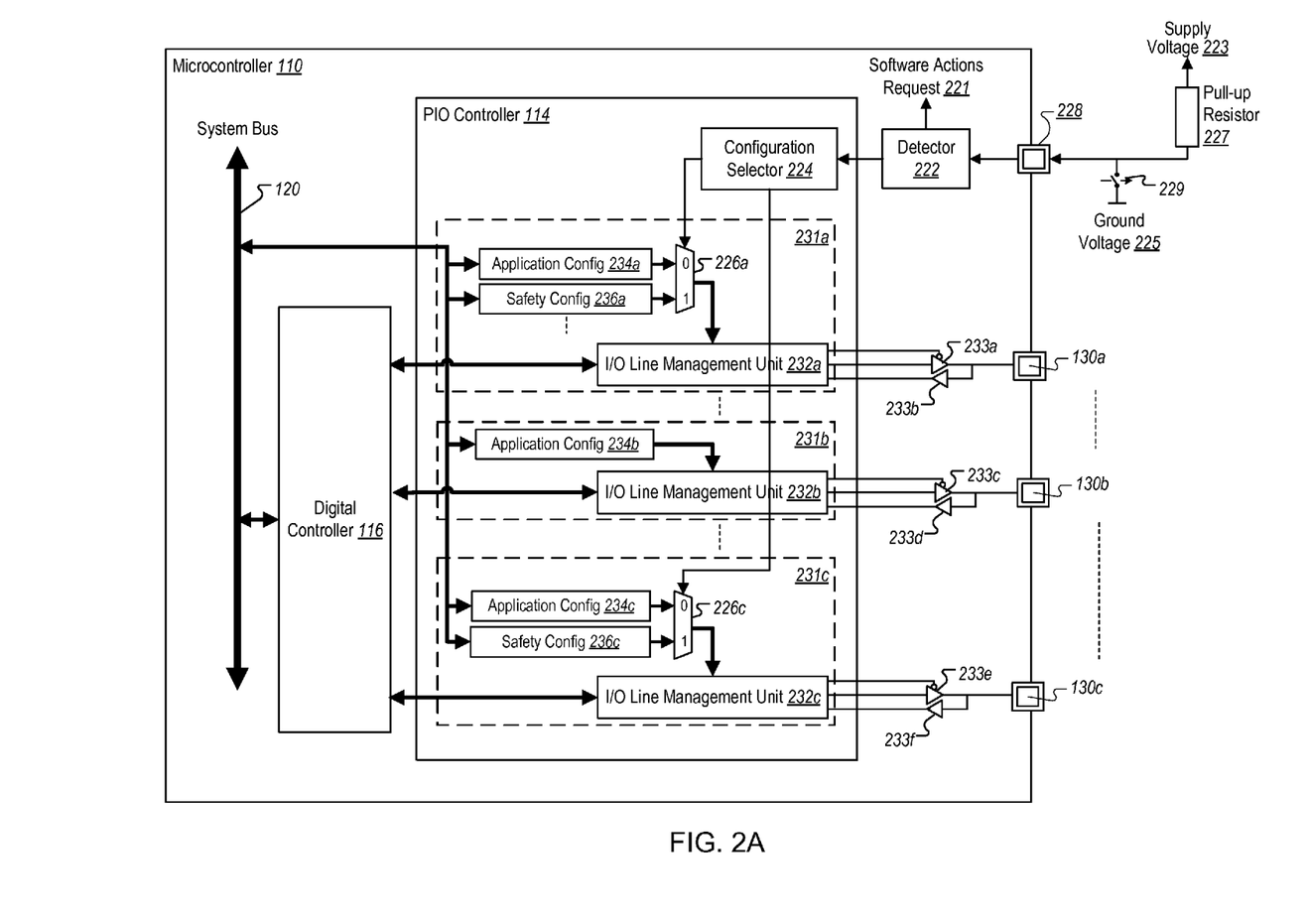
FIGS. 2A-2C are block diagrams of an example microcontroller and components with a hardware module for I/O line safety configuration, according to an embodiment.
Figure 2B:
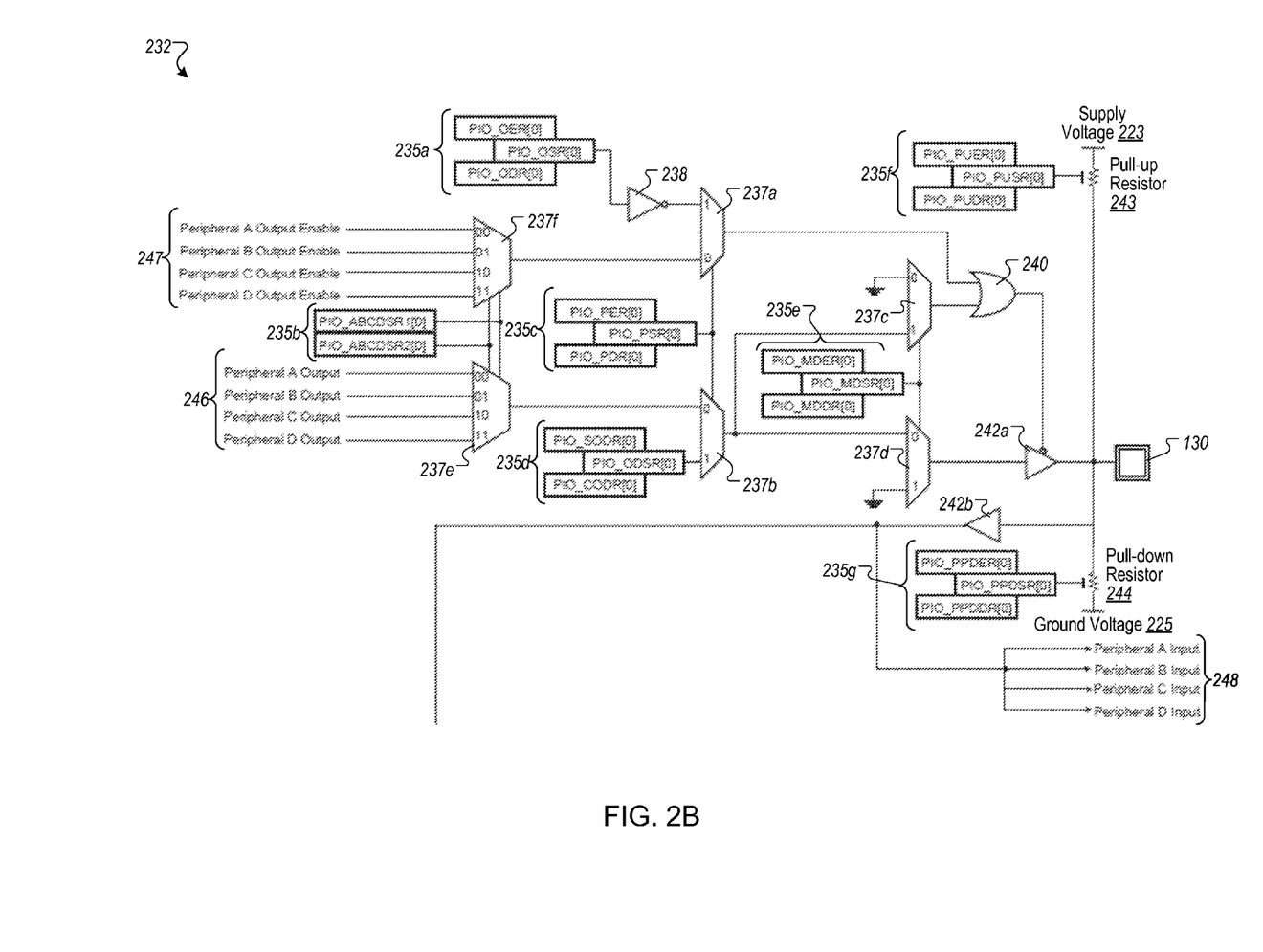
Figure 2C:
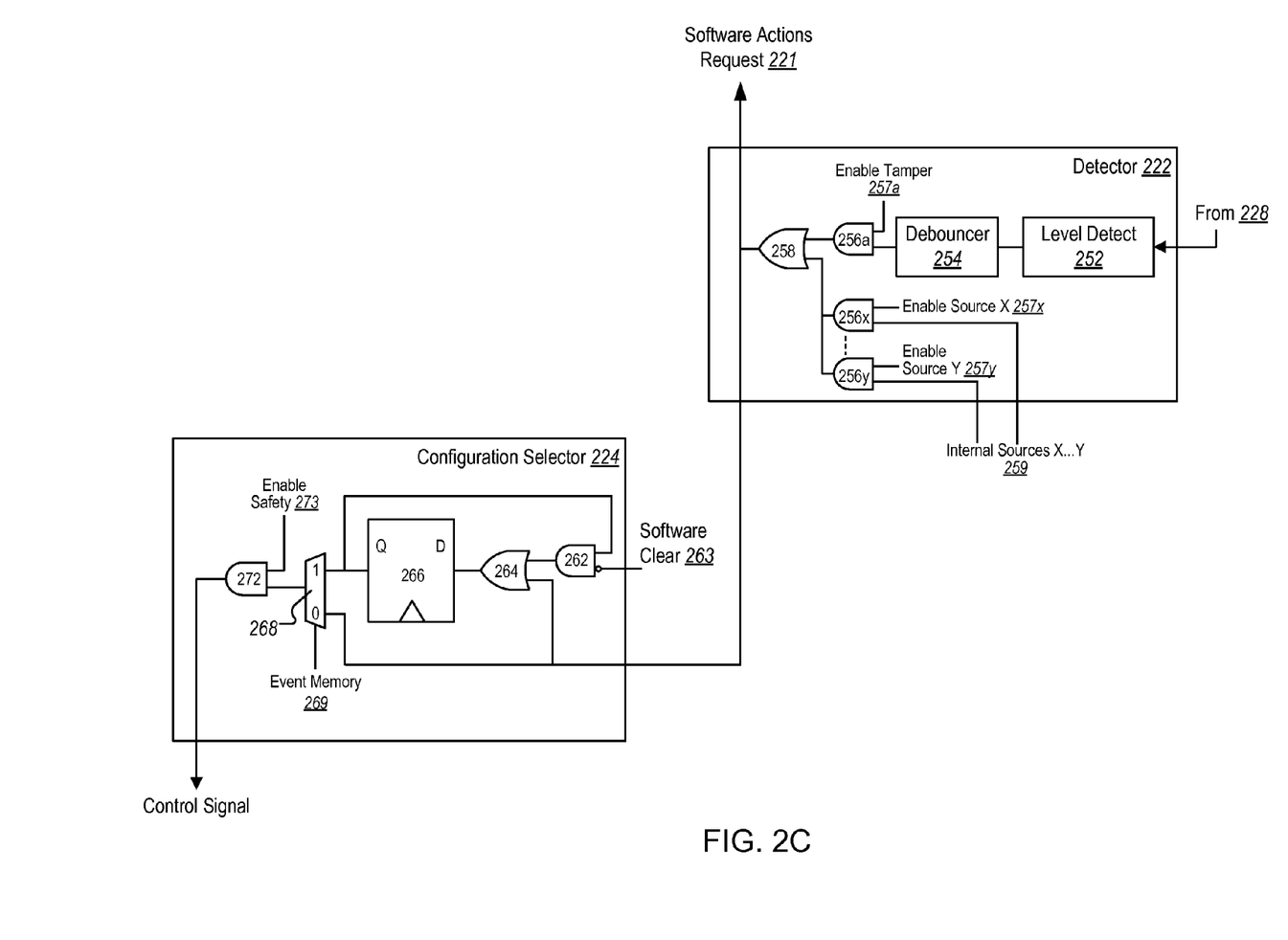

FIGS. 2A-2C are block diagrams of an example microcontroller 110 and components with a hardware module for I/O line safety configuration, according to an embodiment. As shown in FIG. 2A, the microcontroller 110 includes a PIO controller 114, a digital controller 116, a system bus 120, a detector 222, a sensor event line 228, and multiple I/O lines, such as 130a-130c.

One or more I/O lines 130a-130c are configured to interface the microcontroller 110 with the external environment. Although three I/O lines are shown, the microcontroller 110 may include more, or a lesser number of, I/O lines. For example, I/O line 130a may be associated with a network interface that is used to exchange instructions and/or data with a remote device over a network. I/O line 130b may be used to drive, for example, a display coupled to the microcontroller 110, and configured to provide data to the display. I/O line 130c may be associated with an input interface for the microcontroller 110, and configured to receive instructions and/or data provided by a user. The I/O lines 130a-130c, including additional I/O lines not shown in FIG. 2A may be configured for other uses.

The PIO controller 114 includes a number of configuration modules, such as configuration modules 231a, 231b and 231c (as shown), wherein the configuration modules are configured to manage the I/O lines. In one embodiment, each I/O line is configured and managed by a different configuration module 231. As described herein, a configuration module represents a logical collection of hardware in the PIO controller for configuring and managing an I/O line. A configuration module includes registers or other storage memory that store operational configuration parameters for an I/O line and an I/O line management unit that applies the configuration parameters to a corresponding managed I/O line 130. For example, as shown in FIG. 2A, configuration module 231b manages I/O line 130b, and includes memory storing the application configuration 234b and the I/O line management unit 232b, which applies configuration parameters to the I/O line 130b. As shown, the I/O line management unit 232b connects to the I/O line 130b through the buffers 233c and 233d. The memory storing the application configuration 234b may be a hardware register, or some other storage medium. However, in one embodiment, two or more I/O lines are managed by (or share) the same configuration module 231.

Some of the I/O lines 130 in the microcontroller 110 are enabled to operate in a safety mode when an abnormal condition is detected. In such cases, a configuration module 231 corresponding to a safety-enabled I/O line includes additional hardware, such as additional memory to store multiple configuration parameters for the I/O line and a multiplexer that outputs one of the multiple configuration parameters to the corresponding I/O line management unit for managing the associated I/O line. For example, I/O lines 130a and 130c enabled to operate in a safety mode. Configuration module 231a, which corresponds to I/O line 130a, includes storage hardware to store application configuration 234a and safety configuration 236a, and I/O line management unit 232a. The configuration module 231a also includes multiplexer 226a, which is coupled to the hardware storing the application configuration 234a and safety configuration 236a and receives the application configuration 234a and safety configuration 236a at its inputs. The multiplexer 226a outputs one of these two configuration parameters to the I/O line management unit 232a for managing the I/O line 130a. The I/O line management unit 232a connects to the I/O line 130a through the buffers 233a and 233b.

Similarly, configuration module 231c is associated with I/O line 130c, and it includes storage hardware storing application configuration 234c and safety configuration 236c. The configuration module 231c also includes I/O line management unit 232c and multiplexer 226c. The input of the multiplexer 226c is coupled to the hardware storing the application configuration 234c and the safety configuration 236c; and the multiplexer outputs one of the application configuration 234c and safety configuration 236c to the I/O line management unit 232c for managing the I/O line 130c. The I/O line management unit 232c connects to the I/O line 130c through the buffers 233e and 233f.

As described in this disclosure, various configurations are possible for the safety mode for an I/O line. As an illustration, in one embodiment, when safety mode is enabled for an I/O line, the I/O line is configured to operate in a manner that is different from the normal operations expected of the I/O line. For example, if an I/O line is used to communicate data from the microcontroller 110 to the external world (e.g., output mode) when an application configuration in applied to the I/O line, when safety mode is enabled for the I/O line, the output buffer of the I/O line may be disabled and the input buffer enabled, such that the I/O line operates in an input mode to receive data. Accordingly, the I/O line would no longer communicate data to the external world. The reverse is also possible. For an I/O line that operates in input mode when application configuration is applied, may be switched to operate in output mode when safety mode is applied to the I/O line (e.g., disabling the input buffer and the output buffer). Alternatively, when safety mode is enabled for an I/O line, both input and output buffers may be disabled such that the I/O line can no longer communicate with the external environment, either to send data or to receive data.

The storage hardware storing the application configurations 234a and 234c and safety configurations 236a and 236c may be individual registers or other memory in the PIO controller 114. The following sections describe the storage hardware in terms of registers, with the understanding that the description is equally applicable to other forms of storage memory. The application configurations and the safety configurations may be loaded into their respective registers when the microcontroller 110 is turned on. During regular operation, e.g., when no tamper event or other abnormal condition is detected, the I/O lines in the microcontroller 110 operate based on the application configuration parameters. For example, during regular operation, application configuration 234a is applied to I/O line 130a, application configuration 234b is applied to I/O line 130b, while application configuration 234c is applied to I/O line 130c. In one embodiment, the configuration parameters are serially streamed to an I/O line through the corresponding multiplexer.

FIG. 2B is a block diagram of an example of an I/O line management unit 232 of the microcontroller 110, according to an embodiment. The I/O line management unit 232 may be one of I/O line management unit 232a, 232b or 232c. The I/O line management unit 232 includes registers 235a, 235b, 235c, 235d, 235e, 235f and 235g; multiplexers 237a, 237b, 237c, 237d, 237e and 237f; and logic gates 238 and 240. The I/O line management unit 232 is connected to an I/O line 130 through the buffers 242a and 242b. The I/O line 130 may be one of the I/O lines 130a, 130b or 130c.

The I/O line management unit 232 includes an output 246 for forwarding, from connected peripheral modules of the microcontroller 110 (e.g., as shown, peripheral A, peripheral B, peripheral C and peripheral D), content to external devices through the I/O line 130. The I/O line management unit 232 can switch between the outputs for the connected peripherals, and the output for a connected peripheral is enabled or disabled using the peripheral output enable 247. The I/O line management unit 232 also includes an input 248 for sending, to the connected peripheral modules (e.g., peripheral A, peripheral B, peripheral C and peripheral D), content received from external devices through the I/O line 130.

The drive mode of I/O line 130 can be configured in open-drain mode, e.g., pulled up to the supply voltage 223, through the pull-up resistor 243. The voltage level at the I/O line 130 can be decreased, e.g., pulled down to the ground voltage 225, through the pull-down resistor 244. The registers 235f can be used to enable pull-up, while the registers 235g can be used to enable pull-down. The registers 235a-235g can be used for other purposes as well. For example, the registers 235c can be used to enable drive from a digital controller. In an embodiment, the registers 235a-235g are configurable by a user.

Returning to the block diagram of the microcontroller 110 shown in FIG. 2A, when an abnormal condition is detected, the I/O lines 130a and 130c operate in a safety mode using safety configurations 236a and 236c respectively. The PIO controller 114 includes a configuration selector 224 for switching the configuration parameters of the safety-enabled I/O lines from the application configurations to the safety configurations. As described in greater detail below, the configuration selector 224 controls the multiplexer 226a to switch between the application configuration 234a and safety configuration 236a for the I/O line 130a, and controls the multiplexer 226c to switch between the application configuration 234c and safety configuration 236c for application to the I/O line 130c. In one embodiment, less hardware (for example, fewer number of registers) is used to store the safety configurations, compared to the application configurations. The power source used for the safety configuration hardware also may be different compared to that used for the application configuration hardware.

As part of managing an I/O line, an I/O line management unit processes instructions and/or data received at the I/O line that it manages. For example, I/O line 130a may be associated with a network interface as described above, and I/O line management unit 232a may process instructions and/or data that are received at I/O line 130a from a network device. The I/O line management unit 232a may forward the instructions and/or data to a network controller (for example, represented by digital controller 116) for further processing. As another example, I/O line management unit 232b may interact with an LCD controller (represented by digital controller 116) to process data that is sent to the I/O line 130b to drive a display.

In one embodiment, the application configuration parameters applied to different I/O lines are different. Considering the previous example, I/O line 130a may correspond to a network interface, I/O line 130b may be used to drive a display coupled to the microcontroller 110, and I/O line 130c may be associated with an input interface for the microcontroller 110. Accordingly, application configuration 234a corresponding to I/O line 130a may include configuration parameters for processing network instructions and/or data; application configuration 234b corresponding to I/O line 130b may include configuration parameters for processing instructions/data for driving the display controller of the microcontroller; and application configuration 234c corresponding to I/O line 130c may include configuration parameters for processing inputs received from a user.

In one embodiment, the same application configuration is applied to two or more I/O lines. This may be the case, for example, when the corresponding I/O lines perform the same or similar functions. For example, the same application configuration may be applied to two or more I/O lines that are used to drive the display controller of the microcontroller.

In one embodiment, one or more I/O lines in the microcontroller 110 are not enabled to operate in a safety mode of operation. For example, as shown, I/O line 130b is not enabled to operate in a safety mode. The corresponding configuration module 231b includes a single register storing the application configuration 234b that is configured for I/O line 130b, which operates in an operation mode using application configuration 234b even when a tamper event or other abnormal condition is detected. In one embodiment, I/O lines that process non-critical or non-security sensitive instructions and/or data are not safety-enabled (e.g., not enabled to be protected in a safety mode). For example, I/O line 130b may be configured to drive the display controller of the microcontroller, but otherwise not exchange instructions and/or data with the external environment. In such a case, I/O line 130b may not be susceptible to modification by external events, or it cannot modify configuration of other devices since it is not connected to any external device. Accordingly, I/O line 130b may not be safety-enabled.

In an embodiment, all I/O lines in the microcontroller 110 are enabled to operate in a safety mode. In such cases, application configuration and safety configuration are associated with each I/O line, for example in a manner similar to that described with respect to I/O line 130a or 130c.

The configuration selector 224 is a hardware module included in the PIO controller 114 that is configured to select which configuration parameters to apply to the I/O lines. The configuration selector 224 interacts with hardware in the configuration modules associated with safety-enabled I/O lines to apply safety configuration parameters to these I/O lines when a tamper event or other abnormal condition is detected by the detector 222. For example, the configuration selector 224 is coupled to the multiplexer 226a in configuration module 231a associated with I/O line 130a, and coupled to the multiplexer 226c in configuration module 231c associated with I/O line 130c. The configuration selector 224 is triggered by a signal received from the detector 222, which indicates that a tamper event or other abnormal condition is occurring. In one embodiment, a signal is received on the sensor event line 228 senses a tamper event or other external event, and sends a sense signal to the detector 222, which accordingly triggers the configuration selector 224.

In one embodiment, the sensor event line 228 receives indication of an event from one or more sensors connected to the sensor event line 228, e.g., 229. The pull-up resistor 227 is used to couple the one or more sensors, e.g., by performing a logic OR of the sensors, and providing the aggregate output to the sensor event line 228. When no event is detected, the output is at the supply voltage 223. When a sensor detects an event, the output provided to the sensor event line 228 is pulled down and the event is detected by the event detector 222. For example, when the sensor 229 detects an event, the sensor 229 pulls down the voltage level at the sensor event line 228 to the ground voltage 225. The change in voltage level at the sensor event line 228 from the supply voltage to the ground voltage triggers detection of an event by the event detector.

The configuration selector 224 includes internal logic (for example, logic gates) and memorization hardware circuitry (for example, latches, flip-flops) that is configured to generate a control signal to control the switching operation of the multiplexers, such as multiplexer 226a or 226c. In one embodiment, the control signal is generated in response to detection of an abnormal condition, and no control signal is provided to the multiplexers when no abnormal condition is detected. In the absence of the control signal, the normal application configuration parameters are output, and the safety configuration parameters are output in response to the presence of the control signal. As described in greater detail below, in one embodiment, the internal logic and memorization hardware circuit of the configuration selector 224 is also configured to remember the present state of the control signal, and accordingly, whether the application configuration or the safety configuration is output by a multiplexer to its associated I/O line management unit. In such cases, upon receiving a new signal from the detector 222, the configuration selector 224 can determine whether to send an updated control signal to the multiplexers. In one embodiment, the configuration selector 224 includes one or more configuration bits to enable or disable operation of the configuration selector, as described below.

The detector 222 includes hardware circuitry that monitors various signal levels associated with the microcontroller 110, such as voltage or current levels on the I/O lines, internal voltage or current levels, microcontroller temperature, among others. The detector 222 may include hardware circuitry to perform a bitwise OR of the monitored signals, and determine an abnormal condition based on the result of the logic operation. Alternatively, the configuration selector 224 can include hardware circuitry to perform a bitwise OR of the monitored signals, and determine an abnormal condition based on the result of the logic operation. In one embodiment, detector 222 is used to filter events in real time. For example, logic gates included in the detector can be used to perform debouncing logic or other filtering action, among other uses.

As described in greater detail below with respect to FIG. 2C, when an abnormal condition is detected, the detector 222 sends a signal to the configuration selector 224. Additionally or alternatively, the detector may send a Software Actions Request 221 to the microcontroller 110. When the signal is received from the detector 222, the configuration selector 224 sends a control signal (e.g., a safety configuration switch command) to the multiplexers associated with safety-enabled I/O lines, such as multiplexers 226a and 226c.

FIG. 2C is a block diagram of an example of the detector 222 and the configuration selector 224, according to an embodiment. As shown, the detector 222 includes a level detect module 252, a debouncer 254, one or more AND logic gates 256a, 256x and 256y and an OR gate 258. The detector 222 receives a signal from the sensor event line 228 at an input to the level detect 252, which is a hardware circuit that is configured to detect a voltage level, or change thereof (e.g., low or high level), in the signal, and send an output to the debouncer 254. The debouncer 254 is a hardware module that filters that signal received from the level detect 252. In one embodiment, the level detect 252 sends to the debouncer 254 multiple signals associated with a tamper event or external other event. The debouncer 254 is configured to filter the multiple signals and output the result of the filtering, e.g., one of the multiple signals. In another embodiment, there are multiple level detect modules, each associated with a separate signal. Corresponding to a level detect module, there is a separate denouncer for each signal.

The output of the debouncer 254 is provided as an input to the AND gate 256a, which is configured to process signals associated with external events, such as a tamper event or other external event. The triggering of the configuration selector 224 based on processing external event signals by the detector 222 can be enabled or disabled by turning on or off the Enable Tamper signal 257a at an input to the gate 256a. When the Enable Tamper signal 257a is turned on, e.g., signal level high, then external event signals processed by the detector 222 are sent to the configuration selector 224, e.g., the signal provided by the debouncer 254 is sent to the output of the gate 256a. When the Enable Tamper signal 257a is turned off, e.g., signal level low, then external event signals processed by the detector 222 are not sent to the configuration selector 224, e.g., the signal provided by the debouncer 254 is not output by the gate 256a.

In a similar manner, additional AND gates, e.g., 256x and 256y, process signals generated from internal sources 259 at the microcontroller (e.g., signals X and Y, among others). The internal sources 259 detect voltage or current changes, temperature fluctuations, or some other abnormal condition. Although only two gates 256x and 256y are shown, there may be additional gates, e.g., as many gates as the number of internal sources 259 for which the configuration selector 224 is to be triggered.

The triggering of the configuration selector 224 based on processing events from internal sources can be enabled or disabled by turning on or off the enable source signals 257x or 257y at the inputs of the gates 256x or 256y respectively. For example, when the Enable Source X signal 257x is turned on, e.g., signal level high, then an event signal generated by internal source X is provided at the output of the gate 256x, for triggering the configuration selector 224. When the Enable Source X signal 257x is turned off, e.g., signal level low, then an event signal generated by internal source X is not output by the gate 256x and accordingly not used to trigger the configuration selector 224.

The outputs of the AND gates, e.g., 256a, 256x and 256y, are provided as inputs to the OR gate 258. When a signal is output by one of the AND gates, the gate 258 outputs a signal to trigger the configuration selector 224. Additionally or alternatively, in one embodiment, the gate 258 sends a Software Actions Request 221, as noted previously.

The configuration selector 224 includes AND gates 262 and 272, an OR gate 264, a latch circuit 266 and a multiplexer 268. The signal output by the detector 222, e.g., the output of the OR gate 258, is provided as an input to the OR gate 264 and the multiplexer 268. The AND gate 262 receives at its inputs the output of the latch circuit 266 and a Software Clear signal 263, and the output of the gate 262 is provided as a second input of the OR gate 264.

The latch circuit 266, in conjunction with the feedback loop to the gates 262 and 264, is used to retain memory in the configuration selector 224, e.g., the previous state of the configuration selector 224. In one embodiment, the latch circuit 266 is a D-type flip-flop. However, other latch circuits are also possible, e.g., an SR-type flip-flop, among others. The latch circuit 266 and the gates 262 and 264 create a logic that transform a pulse (e.g., output of the detector 222) to a stable state. The state can be cleared by providing the Software Clear signal 263 to the gate 262. In one embodiment, the Software Clear signal 263 is provided by the microcontroller software.

The multiplexer 268 is controlled by the Event Memory signal 269, and it outputs either directly the trigger signal received from the OR gate 258, or the output of the latch circuit 266. The AND gate 272 receives the output of the multiplexer 268 and generates the control signal (e.g., a safety configuration switch command) for controlling the switching operation of the multiplexers associated with the configuration modules corresponding to a safety-enabled I/O line, such as multiplexer 226a or 226c.

In one embodiment, the Event Memory signal 269 is provided by a configuration register. If the Event Memory signal 269 is cleared (e.g., low logic value), safety configurations are applied to the I/O lines for the duration of an abnormal condition. If the Event Memory signal 269 is set (e.g., high logic value), the safety configurations are applied for a period longer than the duration of an abnormal condition, until the state of the configuration selector 224 is cleared by setting the Software Clear signal 263. As noted previously, the Software Clear signal 263 is provided by the microcontroller software, e.g., as acknowledgement of the detection of the abnormal condition.

In one embodiment, the configuration selector 224 is enabled or disabled based on the Enable Safety signal 273. For example, when the Enable Safety signal 273 is turned on, e.g., signal level high, then the AND gate 272 generates the control signal at its output upon receiving a trigger signal from the detector 222. However, when the Enable Safety signal 273 is turned off, e.g., signal level low, then the AND gate 272 does not provide an output and accordingly does not generate the control signal. In such cases, the I/O lines operate using their respective application configurations, and does not use safety configurations.

Returning to the block diagram of the microcontroller 110 shown in FIG. 2A, during operation, the multiplexers switch the application configurations to their outputs, which are then applied by the I/O line management units to the respective I/O lines. For example, multiplexer 226a outputs application configuration 234a to I/O line management unit 232a, such that I/O line 130a uses application configuration 234a. Similarly, multiplexer 226c outputs application configuration 234c to I/O line management unit 232c, such that I/O line 130c uses application configuration 234c.

When the configuration selector 224 sends the control signal (e.g., a safety configuration switch command), the multiplexers switch to send the safety configurations to their outputs, which are then applied by the I/O line management units to the respective I/O lines. For example, multiplexer 226a is controlled by the control signal to output safety configuration 236a to I/O line management unit 232a, such that I/O line 130a operates in safety mode using safety configuration 236a. Similarly, multiplexer 226c is controlled by the control signal to output safety configuration 236c to I/O line management unit 232c, such that I/O line 130c operates in safety mode using safety configuration 236c. However, I/O line 130b, which does not have a safety configuration, continues to operate based on the application configuration parameters 234b.

In this manner, detection of an abnormal condition or event by the detector 222 triggers the configuration selector 224 to switch the safety-enabled I/O lines to the safety mode of operation, while allowing non-safety-enabled I/O lines to continue operation. The switch from the application configuration to the safety configuration is enabled in hardware, for example using the configuration selector 224, the multiplexers 226a and 226c and additional storage for preloading the safety configurations into the PIO controller 114. No software reconfiguration of the PIO controller 114 is involved. Accordingly, the safety configuration switch of the I/O lines may be done rapidly when the detector sends the signal to the configuration selector 224.

In contrast, in situations that do not implement the configuration selector 224 and the multiplexers, the detector has to send a Software Actions Request 221, for example to a processor in the microcontroller 110. In such cases, the PIO controller may include a smaller number of registers that store either the application configuration or the safety configuration at a time. To reconfigure the I/O line management units with safety configuration parameters, the processor may load the safety configurations from memory into the registers. Such software reconfiguration of the PIO controller can take considerably more time compared to the hardware switching approach described above, for example if detection of the abnormal condition leads to interruption management.

In one embodiment, the safety configurations applied to different I/O lines are different. Considering the previous example, I/O line 130a may be associated with a network interface, and I/O line 130c may be associated with an input interface for the microcontroller 110. Accordingly, safety configuration 236a corresponding to I/O line 130a may include configuration parameters to disable reception or transmission of network instructions and/or data at I/O line 130a. In such a case, the safety configuration 236a may effectively block I/O line 130a from communicating with network devices, and thereby prevent the possibility of the microcontroller 110 receiving malicious instructions and/or data from a remote network device. Safety configuration 234c corresponding to I/O line 130c may include configuration parameters to disable I/O line 130c for processing user inputs, to prevent the possibility of the unauthorized inputs from an attacker.

In one embodiment, the same safety configuration is applied to two or more PO lines. This may be the case, for example, when the corresponding I/O lines perform similar functions. For example, the same safety configuration may be applied to two or more PO lines that are used to process user inputs received at the microcontroller 110.

In one embodiment, safety configurations for the I/O lines are programmed in the microcontroller at the time of manufacture, and these configurations are not modifiable by a user. For example, the safety configurations 236a and 236c may be configured and locked by a boot program in a boot sector of the microcontroller 110, which may be implemented in read-only memory (ROM) or non-editable registers. When the microcontroller is powered up, the safety configurations 236a and 236c may be loaded into respective registers in the PIO controller 114 from the boot sector (for example, by the boot program). Instructions and/or data that are critical for the correct operation of the microcontroller 110 may be configured and locked by the boot program in the boot sector and prevented from modifications for security. Accordingly, malicious software that can otherwise modify the microcontroller may be prevented from modifying the safety configurations of the I/O lines. Further, since the safety configurations are immediately and automatically applied to the I/O lines when the configuration selector 224 is triggered by the detector 222, the malicious software also may not be able to prevent the PIO controller 114 logic from applying the safety configurations, already loaded into the PIO registers and locked against further modifications, to the I/O lines as soon as an abnormal condition is detected, thereby controlling the I/O lines to operate in the safety mode. In this manner, enhanced security may be provided by the microcontroller 110.

In one embodiment, the application configurations for the I/O lines are modifiable by a user. For example, the microcontroller 110 may ship with default versions of the application configurations 234a, 234b and 234c, which are stored in microcontroller memory that is modifiable. A user (for example, a system administrator managing the device in which the microcontroller 110 is used) may update one or more of these application configurations during operation of the microcontroller 110, for example to reconfigure one or more I/O lines to process different kinds of instructions and/or data, and apply the updated application configuration(s) to the respective I/O line(s). In this manner, the functionality of the I/O lines may be adjusted during use of the microcontroller 110.

In one embodiment, the safety configurations for the I/O lines are modifiable by a user. For example, the microcontroller 110 may ship with default versions of the safety configurations 236a and 236c, which are stored in microcontroller memory that is modifiable. A user (for example, a system administrator managing the device in which the microcontroller 110 is used) may update one or more of these safety configurations during operation of the microcontroller 110, for example to reconfigure the actions taken by one or more I/O lines when an abnormal condition is detected, and apply the updated safety configuration(s) to the respective I/O line(s). This may be the case, for example, when the microcontroller is embedded in kitchen appliances, where reliable operation may be more important than enhanced security. In such cases, both application configurations and safety configurations may be configurable. In this manner, the user can be provided with the option to customize the safety parameters or settings for the microcontroller 110 according to the requirements of the system in which the microcontroller is used.

In one embodiment, one or more I/O lines in a microcontroller are each associated with multiple safety configurations. The configuration selector circuit in the PIO controller applies one of the multiple available safety configurations to an I/O line, depending on the nature of the abnormal condition detected. For example, one or more additional safety configuration may be configured for I/O line 130a and stored in additional configuration registers, as indicated by the ellipsis following the register for safety configuration 236a. Other I/O lines may be configured with multiple safety configurations in a similar manner, while some other I/O lines may be configured with a single safety configuration. For example, as shown, a single safety configuration 236c is configured for I/O line 130c.

When an I/O line is configured with multiple safety configurations, the application configuration and the multiple safety configurations are provided as multiple inputs to the multiplexer. For example, in an embodiment in which I/O line 130a is configured with two safety configurations—236a as shown and an additional safety configuration stored in another configuration register—these safety configurations and the application configuration 234a are provided as three inputs to multiplexer 226a. The configuration selector 224 controls the multiplexer 226a to output, at a time, one of these three configurations to the I/O line management unit 232a for managing I/O line 130a.

In an embodiment where multiple safety configurations are available for an I/O line, one of these safety configurations is applied to the I/O line depending on the type of abnormal condition detected. In such cases, when the detector 222 detects an abnormal condition in the microcontroller 110, the detector determines a type of the abnormal condition and sends a different signal to the configuration selector 224 based on the determined type. For example, the detector 222 may send a first signal when the abnormal condition is determined to be produced by an external source, such as unauthorized instructions and/or data received at an I/O line from an external device, or an external physical probe on the microcontroller body. The detector 222 may send a second signal when the abnormal condition is determined to be produced internally, such as malicious software that attempts to send unauthorized instructions and/or data to an external device through an I/O line, or a sudden rise in internal temperature of the microcontroller.

In such cases where the detector 222 sends different signals depending on the type of the abnormal condition, the configuration selector 224 generates different control signals depending on the type of the abnormal condition. For example, when the first signal is received from the detector 222 indicating an abnormal condition produced by an external source, the configuration selector 224 sends a first control signal (e.g., a first safety configuration switch command) to the multiplexer 226a to switch its inputs and output the safety configuration 236a to the I/O line management unit 232a, for applying to the I/O line 130a. This may be the case, for example, when the safety configuration 236a is configured to protect the I/O line 130a from external attacks. Based on the safety configuration 236a, the I/O line 130a may stop accepting instructions and/or data from external sources.

When the second signal is received from the detector 222 indicating an abnormal condition produced by internally in the microcontroller 110, the configuration selector 224 sends a second control signal (e.g., a second safety configuration switch command) to the multiplexer 226a to switch its inputs and output the second safety configuration to the I/O line management unit 222a. This may be the case, for example, when the second safety configuration is configured to protect external devices, or the microcontroller 110 itself, from attacks generated internally. Based on the second safety configuration, the I/O line 130*a* may stop sending instructions and/or data to external sources. In this manner, the response of the I/O line 130*a* to different types of abnormal conditions may be different.

In either situation, the multiplexer 226*c* may be configured to output the safety configuration 236*c* to the I/O line management unit 232*c*, when either the first or the second control signal is received from the configuration selector 224. Accordingly, the I/O line 130*c* may exhibit similar safety configuration behavior irrespective of the type of the abnormal condition. Further, I/O line 130*b*, which does not have a safety configuration, continues to operate based on the application configuration parameters 234*b*.

In one embodiment where an I/O line, for example, 130*a*, has multiple safety configurations, the configuration selector 224 determines the type of the abnormal condition and accordingly sends a control signal to the multiplexer 226*a* to output either one of the multiple safety configurations. In such cases, the detector 222 sends a signal to the configuration selector 224 along with information about the abnormal condition. The internal logic in the configuration selector 224 determines the type of the abnormal condition based on the information provided by the detector 222.

In one embodiment, the multiple safety configurations are configured once, for example at the time of manufacture or deployment of the microcontroller 110, and are not modifiable by a user, similar to that described with respect to safety configurations may 236*a* and 236*c*. These safety configurations may be stored in a boot sector of the microcontroller 110 (for example, configured and then locked by a boot program) and loaded into the configuration registers in the PIO controller 114, or other memory locations, when the microcontroller 110 powers up.

In the manner described above, a microcontroller can be implemented with additional hardware circuitry in the PIO controller to apply safety parameters to the microcontroller I/O lines upon detection of an abnormal condition. The safety parameters may be applied automatically and immediately when the abnormal condition is detected, without requiring software intervention (for example, reconfiguring the PIO controller using software). Different safety parameters may be applied to different I/O lines, and some I/O lines may not have any safety configuration. Further, a type of the abnormal condition may be determined and different safety parameters may be applied to an I/O line depending on the determined type of the abnormal condition.

Figure 3:
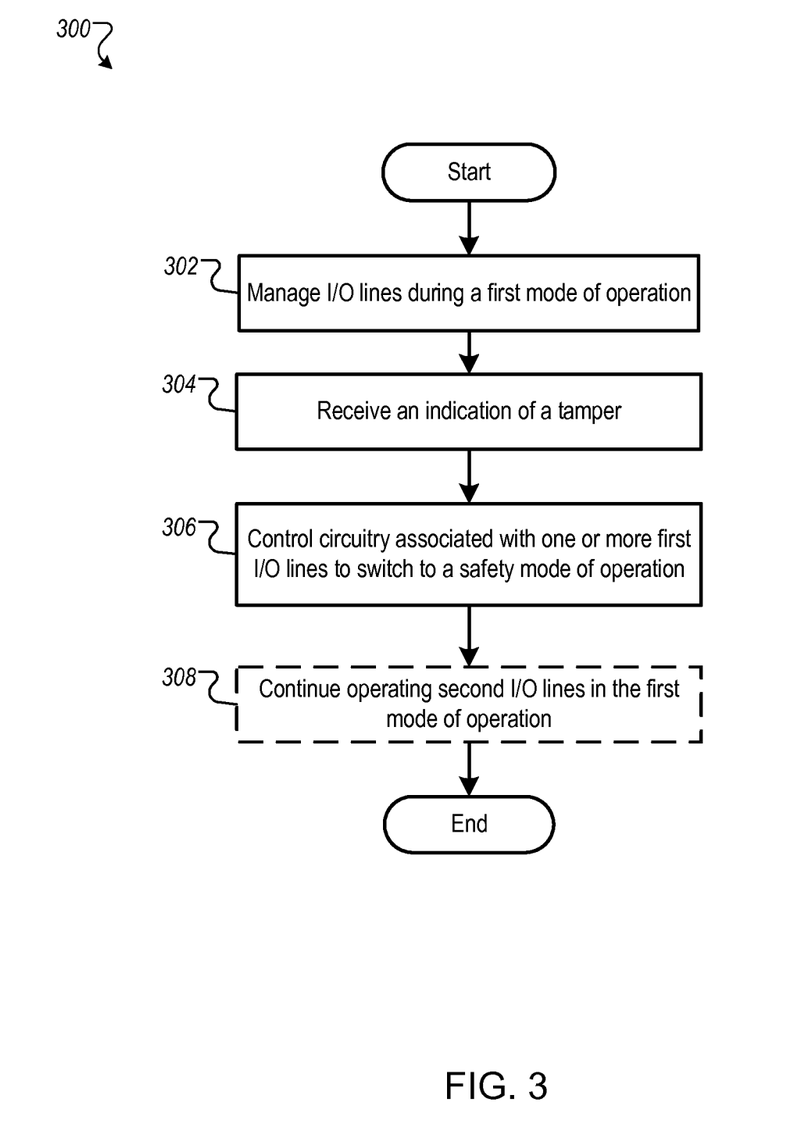
FIG. 3 is a flow diagram of an example process for applying a safety configuration to a microcontroller I/O line upon detection of an abnormal condition, according to an embodiment.

FIG. 3 is a flow diagram of an example process 300 for applying a safety configuration to a microcontroller I/O line upon detection of an abnormal condition, according to an embodiment. The process 300 may be performed by a microcontroller (for example, the microcontroller 110).

In one embodiment, the process 300 is performed by one or more processors (for example, processor 112 in the microcontroller 110). The processors execute instructions stored in memory coupled to the respective device.

The process 300 starts by managing I/O lines of a microcontroller during a first mode of operation at 302. A PIO controller applies application configurations to I/O lines in the first mode of operation. For example, PIO controller 114 applies application configuration 234*a* to I/O line 130*a*, application configuration 234*b* to I/O line 130*b*, and application configuration 234*c* to I/O line 130*c*. During the first mode of operation, a configuration selector may control a multiplexer to output the application configuration to the corresponding I/O line management unit. For example, configuration selector 224 may control a multiplexer 226*a* to output the application configuration 234*a* to I/O line management unit 232*a* and may control the multiplexer 226*c* to output the application configuration 234*c* to I/O line management unit 232*c*.

At 304, an indication of a tamper event is received. For example, the configuration selector (for example, configuration selector 224) receives a signal from the detector (for example, detector 222), which indicates that the detector has detected occurrence of a tamper event or other abnormal condition in the microcontroller.

At 306, circuitry associated with one or more first I/O lines are controlled to switch to a safety mode of operation. For example, when the signal is received from the detector indicating a tamper event, the configuration selector sends a control signal (e.g., a safety configuration switch command) to the multiplexers associated with safety-enabled I/O lines (for example, multiplexers 226*a* and 226*c*). The multiplexers switch their inputs to send the safety configurations to their outputs, which are then applied by the I/O line management units to the respective I/O lines. For example, multiplexer 226*a* outputs safety configuration 236*a* to I/O line management unit 232*a*, such that I/O line 130*a* operates in safety mode using safety configuration 236*a*. Similarly, multiplexer 226*c* outputs safety configuration 236*c* to I/O line management unit 232*c*, such that I/O line 130*c* operates in safety mode using safety configuration 236*c*.

At 308, operation of second I/O lines in first mode of operation is continued. For example, an I/O line that does not have a safety configuration continues to operate based on the application configuration parameters corresponding to the I/O line, after the indication of the tamper event is received at the configuration selector. For example, I/O line 130*b*, which does not have a safety configuration, continues to operate based on the application configuration parameters 234*b*, after the indication of the tamper event is received at the configuration selector 224. Step 308 is an optional part of the process 300, for example implemented in microcontrollers with one or more I/O lines that are not safety-enabled. However, microcontrollers in which all I/O lines are safety enabled may not implement 308.

In the above manner, instructions associated with the process 300 control hardware circuitry in a PIO controller, such as a configuration selector and multiplexers included in configuration modules, to automatically and immediately apply safety configurations to the microcontroller I/O lines when an abnormal condition is detected by a microcontroller detector. In an embodiment, no software reconfiguration of the PIO controller is needed to apply the safety configurations to the I/O lines.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in a sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and embodiments are disclosed. Variations, modifications, and enhancements to the described examples and embodiments and other embodiments can be made based on what is disclosed.

What is claimed is:

1. A device comprising:
   a detector configured to detect an event;
   a selector coupled to the detector and configured to generate a signal in response to a detection of an event by the detector, the signal operable to select a set of input/output (I/O) parameters from among first and second stored sets of parameters; and
   a configuration module that is coupled to the selector and includes (i) a multiplexer and (ii) an I/O line management unit coupled to the multiplexer and an I/O line,
   wherein multiplexer is configured to:
      receive the first and second stored sets of parameters as inputs,
      receive the signal from the selector, and
      send one of the first and second stored sets of parameters to the I/O line management unit based on receiving the signal from the selector, and
   wherein the I/O line management unit is configured to:
      receive, from the multiplexer, one of the first and second stored sets of parameters, and
      adapt the I/O line to a selected configuration corresponding to the set of parameters received from the multiplexer.

2. The device of claim 1, wherein the configuration module includes a first register for storing the first set of parameters and a second register for storing the second set of parameters, and wherein outputs of the first register and the second register are coupled to inputs of the multiplexer.

3. The device of claim 1, wherein the first set of parameters includes first configuration parameters associated with a first mode of operation for a first I/O line and the second set of parameters includes safety configuration parameters associated with a safety mode of operation for the first I/O line.

4. The device of claim 3, wherein the first configuration parameters are reconfigurable by a user, and wherein the safety configuration parameters are not reconfigurable by a user, and
   wherein the selector is configured to:
      receive an indication of the event detection from the detector; and
      in response to receiving the indication of the event detection, send the signal to the configuration module to apply the safety configuration parameters to the first I/O line.

5. The device of claim 4, wherein the device includes a second I/O line that is configured to operate in the first mode of operation in response to receiving the indication of the event detection at the selector.

6. The device of claim 3, wherein the safety mode of operation includes preventing the first I/O line from communicating with an external device.

7. The device of claim 3, wherein the safety mode of operation includes a first safety mode of operation and a second safety mode of operation, and
   wherein the configuration module is configured to:
      switch the first I/O line from the first mode of operation to the first safety mode of operation in response to occurrence of an event of a first type; and
      switch the first I/O line from the first mode of operation to the second safety mode of operation in response to occurrence of an event of a second type.

8. The device of claim 7, wherein the configuration module includes first configuration parameters associated with the first I/O line, first safety configuration parameters and second safety configuration parameters associated with the first I/O line and a multiplexer that is configured to:
   receive as inputs the first configuration parameters, the first safety configuration parameters and the second safety configuration parameters; and
   output one of the first configuration parameters, the first safety configuration parameters and the second safety configuration parameters to manage the first I/O line based on the signal from the selector.

9. The device of claim 8, wherein the selector is configured to:
   in response to a determination that a first detected event is of a first type, send a first signal to the multiplexer to output the first safety configuration parameters; and
   in response to a determination that a second detected event is of a second type, send a second signal to the multiplexer to output the second safety configuration parameters.

10. The device of claim 1, wherein the event is associated with one or more of an abnormal physical condition of the device, an unauthorized external probe applied to the device, and an unauthorized execution command applied to the device.

11. A method comprising:
    detecting, by a detector, an event;
    in response to the detection of the event, generating, by a selector coupled to the detector, a signal that is operable to select a set of input/output (I/O) parameters from among first and second stored sets of parameters; and
    outputting, by a configuration module coupled to the selector, the selected set of I/O parameters, wherein outputting, by the configuration module, the selected set of I/O parameters comprises:
       receiving, at a multiplexer included in the configuration module, the signal from the selector;
       outputting, by the multiplexer, one of the first and second stored sets of parameters based on receiving the signal from the selector,
       receiving, at an I/O line management unit that is included in the configuration module and coupled to the multiplexer and an I/O line, one of the first and second stored sets of parameters from the multiplexer, and
       adapting, by the I/O line management unit, the I/O line to a selected configuration corresponding to the set of parameters received from the multiplexer.

12. The method of claim 11, wherein the first set of parameters includes first configuration parameters associated with a first mode of operation for a first I/O line and the second set of parameters includes safety configuration parameters associated with a safety mode of operation for the first I/O line.

13. The method of claim 12, wherein the first configuration parameters are reconfigurable by a user, and wherein the safety configuration parameters are not reconfigurable by a user, the method comprising:
   receiving, at the selector, an indication of the event detection from the detector; and
   in response to receiving the indication of the event detection, sending, by the selector, the signal to the configuration module to apply the safety configuration parameters to the first I/O line.

14. The method of claim 12, wherein the safety mode of operation includes preventing the first I/O line from communicating with an external device.

15. The method of claim 12, wherein the safety mode of operation includes a first safety mode of operation and a second safety mode of operation, the method further comprising:
   switching, by the configuration module, the first I/O line from the first mode of operation to the first safety mode of operation in response to occurrence of an event of a first type; and
   switching, by the configuration module, the first I/O line from the first mode of operation to the second safety mode of operation in response to occurrence of an event of a second type.

16. The method of claim 15, wherein the configuration module includes first configuration parameters associated with the first I/O line, first safety configuration parameters and second safety configuration parameters associated with the first I/O line and a multiplexer, the method further comprising:
   receiving as inputs, at the multiplexer, the first configuration parameters, the first safety configuration parameters and the second safety configuration parameters; and
   outputting, by the multiplexer, one of the first configuration parameters, the first safety configuration parameters and the second safety configuration parameters to manage the first I/O line based on the signal from the selector.

17. The method of claim 16, wherein outputting, by the multiplexer, one of the first configuration parameters, the first safety configuration parameters and the second safety configuration parameters comprises:
   in response to a determination that a first detected event is of a first type, sending, by the selector, a first signal to the multiplexer to output the first safety configuration parameters; and
   in response to a determination that a second detected event is of a second type, sending, by the selector, a second signal to the multiplexer to output the second safety configuration parameters.

18. The method of claim 11, wherein the event is associated with one or more of an abnormal physical condition of a device, an unauthorized external probe applied to the device, and an unauthorized execution command applied to the device.

* * * * *

UNITED STATES PATENT AND TRADEMARK OFFICE
CERTIFICATE OF CORRECTION

PATENT NO. : 9,934,377 B2
APPLICATION NO. : 14/946901
DATED : April 3, 2018
INVENTOR(S) : Pierre Samat, Alain Vergnes and Michel Douguet It is certified that error appears in the above-identified patent and that said Letters Patent is hereby corrected as shown below:

In the Specification

In Column 15 Line 2 delete "PO" and insert --I/O--, therefor.

In Column 15 Line 5 delete "PO" and insert --I/O--, therefor.

Signed and Sealed this
Twenty-second Day of May, 2018

Andrei Iancu
*Director of the United States Patent and Trademark Office*